3,264,893
GEARSHIFT MECHANISMS FOR CHANGE-SPEED GEARS

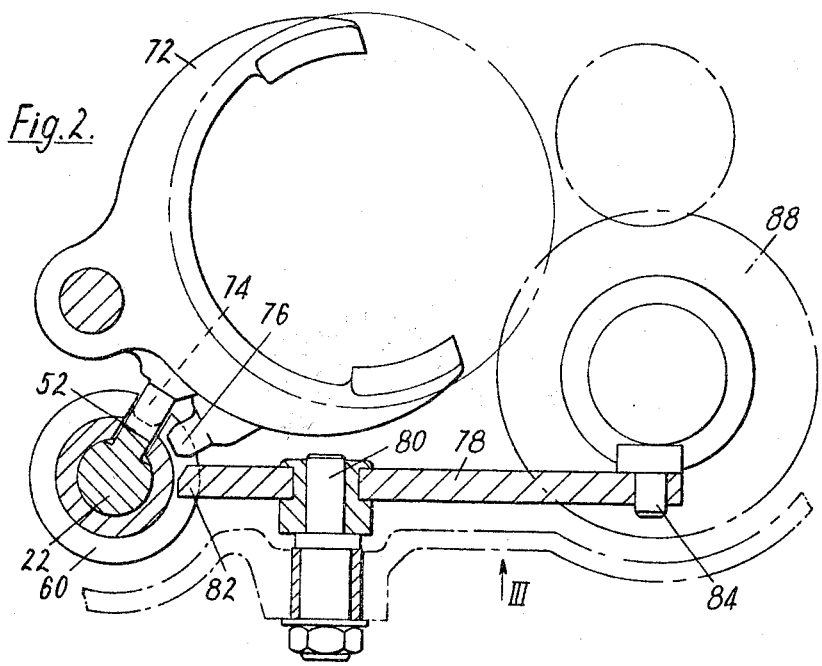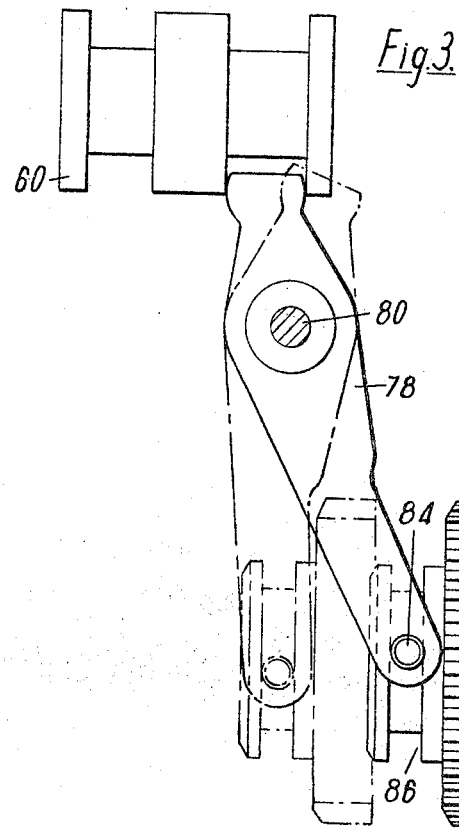

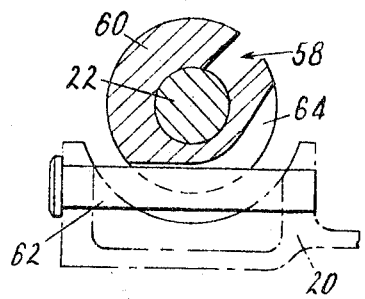
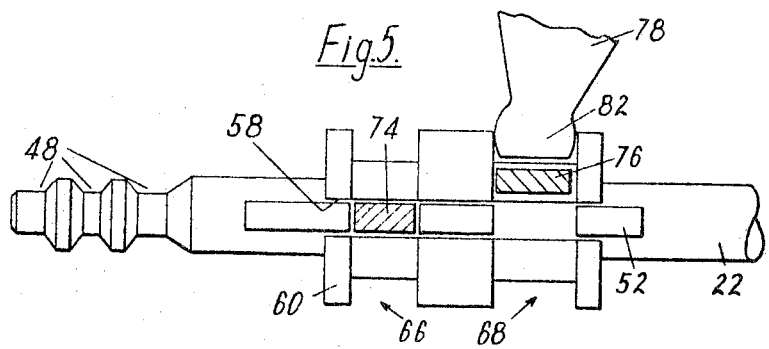
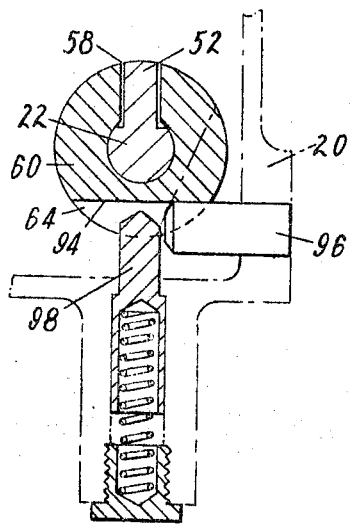

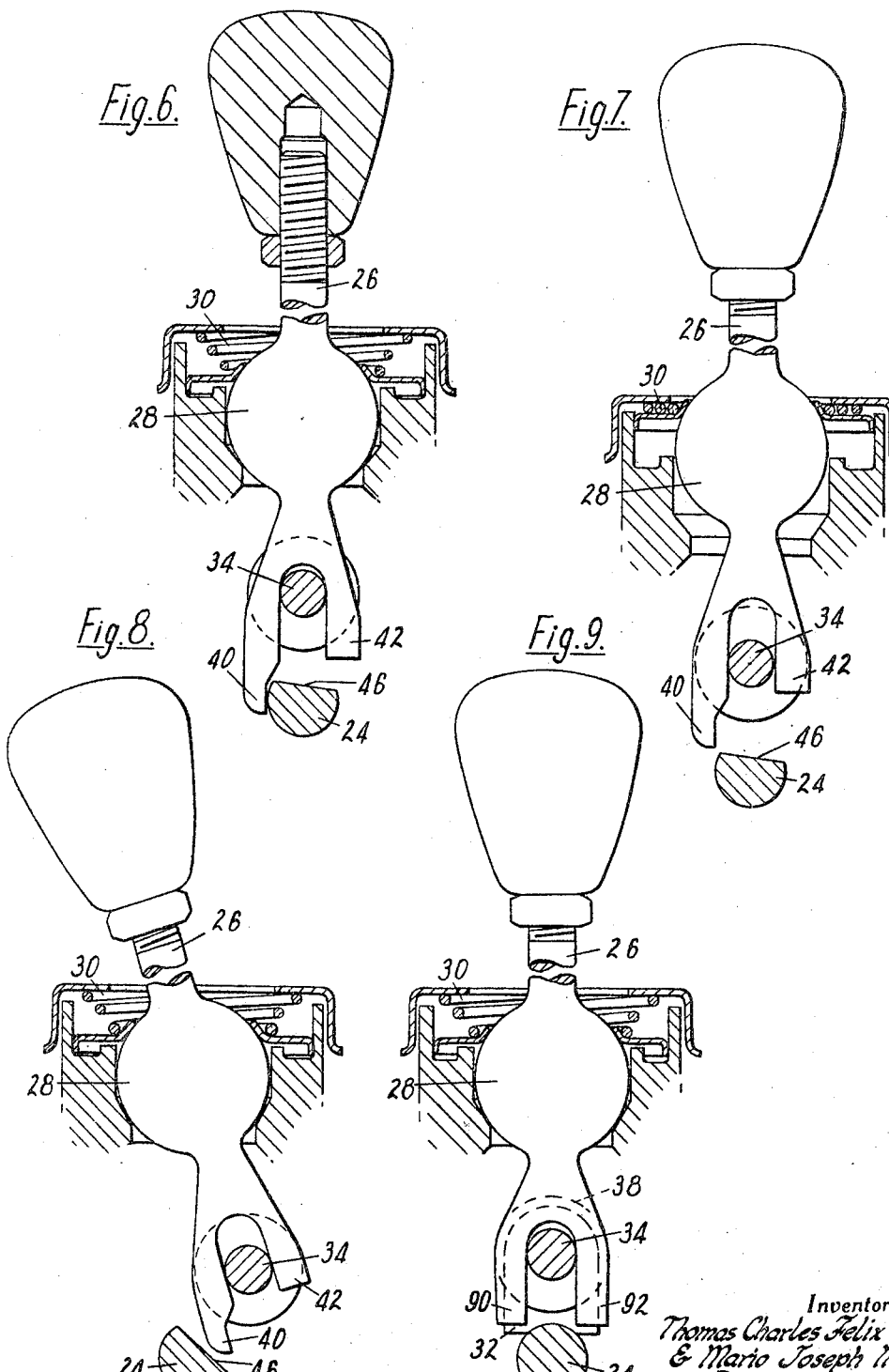

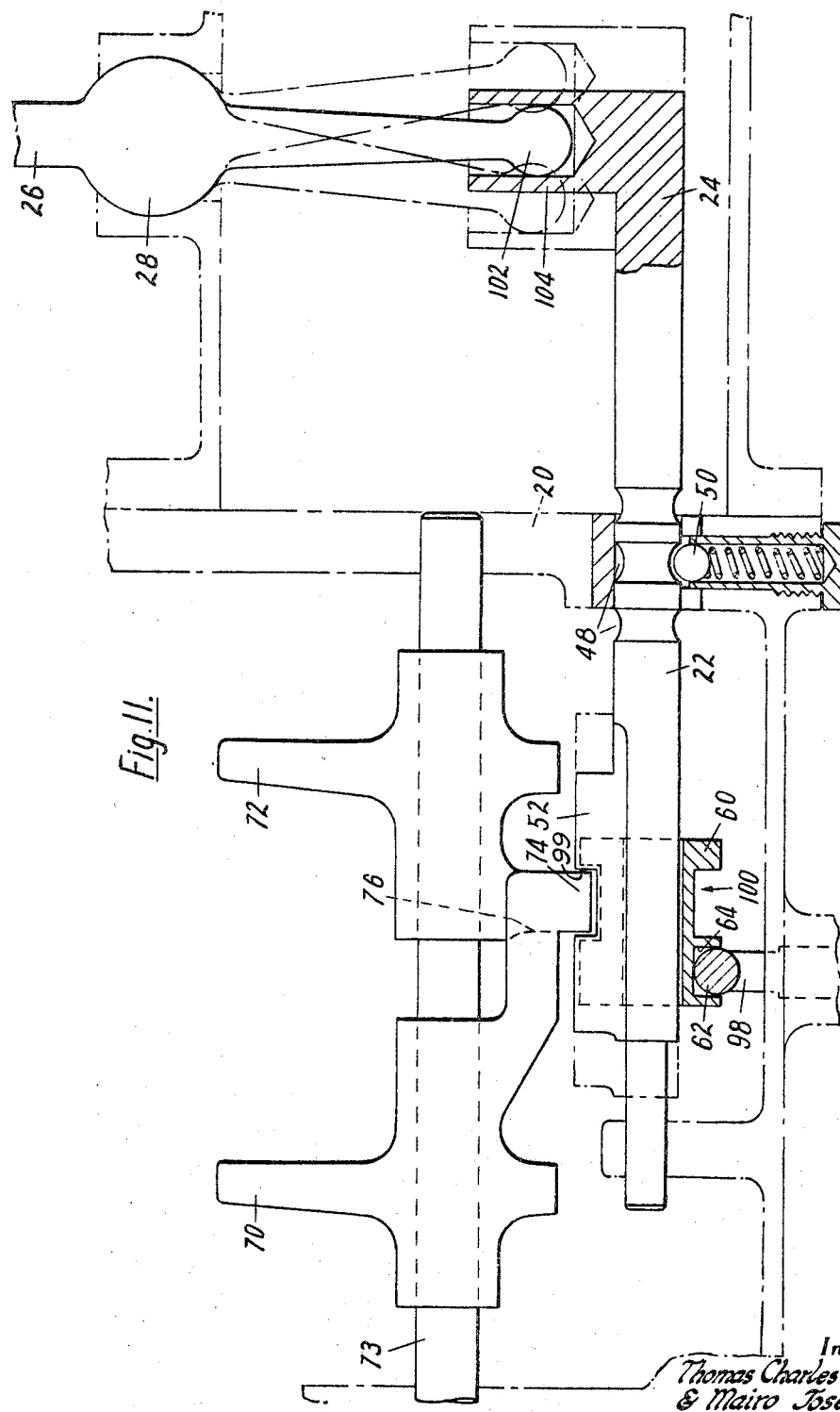

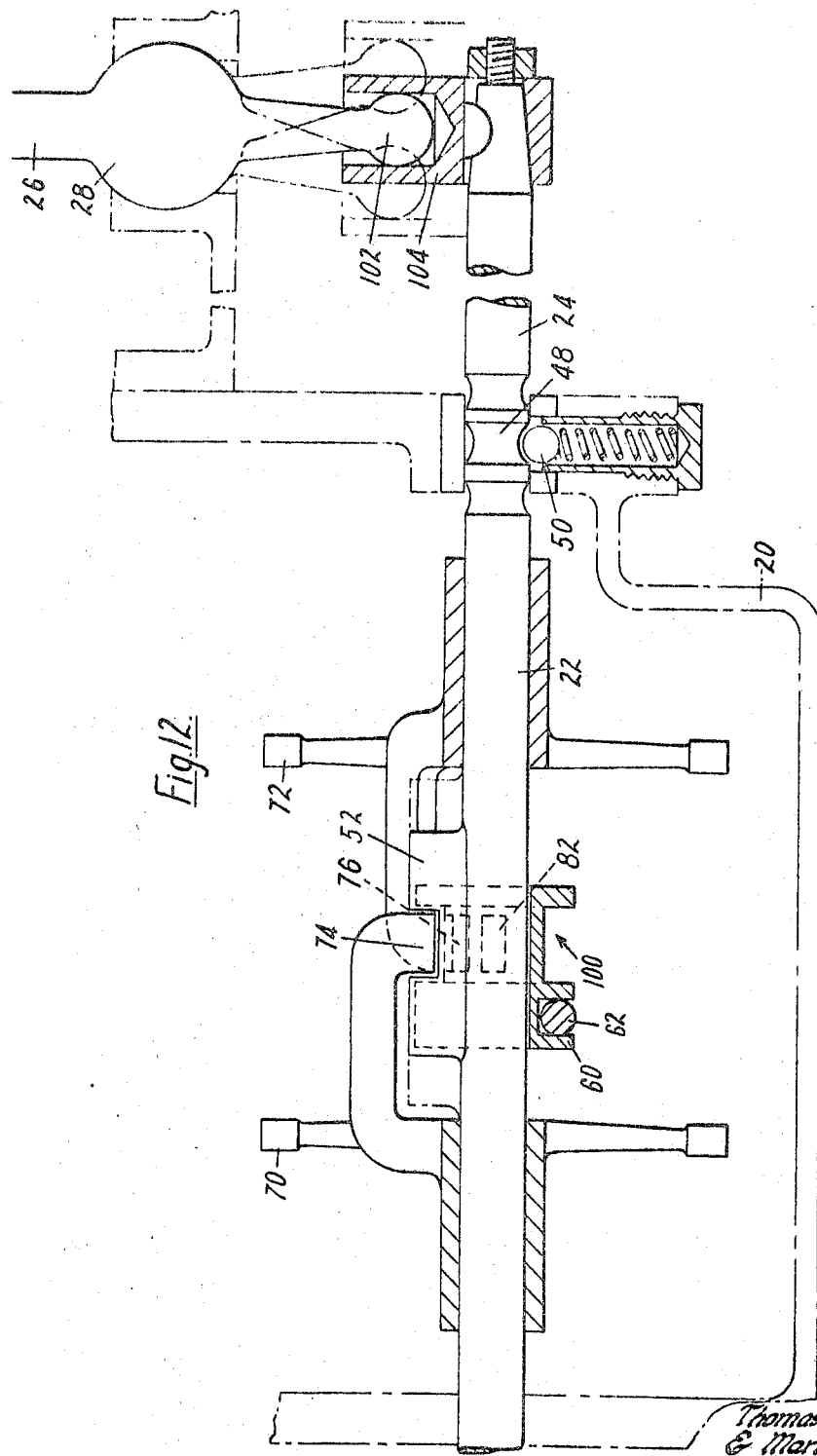

Thomas Charles Felix Stott, Harpenden, and Mario Joseph Maina, Luton, England, assignors to General Motors Corporation, a corporation of Delaware
Filed Aug. 5, 1963, Ser. No. 299,801
Claims priority, application Great Britain, Sept. 28, 1962, 36,872/62, 36,874/62; Apr. 11, 1963, 14,700/63, 14,701/63
17 Claims. (Cl. 74—477)

This invention relates to gearshift mechanisms for effecting displacement of coupling members of change-speed gears between neutral and ratio-engaging positions.

It is an object of the present invention to provide a gearshift mechanism which is simple and compact and which is capable of accurate and positive operation. It is a further object of the invention to provide a gearshift mechanism which shall have particular utility in motor vehicles having a floor-mounted gearshift lever, preferably one which is remote from the vehicle gearbox.

In accordance with these objects, from one aspect, a gearshift mechanism according to the invention for effecting displacement of coupling members of a change-speed gear between neutral and ratio-engaging positions comprises a gearshift lever pivotally mounted remotely from the gearbox casing, a pivotal connection between the lower end portion of the gearshift lever and the free end of the selector shaft, a plurality of striker devices mounted within the gearbox casing and slidable to effect said displacement of said coupling members, a plurality of striker device lugs extending from the respective striker devices, an axially extending key-like projection on said selector shaft defining a recess intermediate the ends of the projection, the lugs of the striker devices being spaced around the selector shaft and being disposed, when the mechanism is in a neutral position, in a common radial plane with the recess such that movement of the gearshift lever to effect rotary movement of the selector shaft causes any selected lug to lie within the recess and subsequent movement of the gearshift lever to effect axial movement of the selector shaft causes the key-like projection to engage the selected lug and thereby effect sliding movement of the selected striker device, the mechanism also comprising an interlock sleeve which is mounted on the selector shaft for rotation with the shaft, and detent means for preventing the interlock sleeve from moving axially relatively to the gearbox casing, the interlock sleeve defining a circumferential groove which is entered by the striker device lugs and also defining an axial groove which intersects the circumferential groove and is entered by the axially extending key-like projection, such that the said rotary movement of the selector shaft causes the selector striker device lug to enter the axial groove and the said subsequent axial movement of the selector shaft moves said lug along the axial groove, the walls of the circumferential groove preventing movement of the other lugs.

Preferably said striker devices are slidable along a common striker device rail which is mounted within the gearbox casing. However, a very compact construction is attainable wth an alternative mechanism in which the striker devices are mounted on the selector shaft itself.

For convenience in the layout of the parts of the mechanism it is highly advantageous for the axially extending key-like projection on the selector shaft to define a plurality of recesses axially spaced intermediate the ends of the projection such that, when the mechanism is in a neutral position, each of the recesses is in a common radial plane with at least one of the striker device lugs, the interlock sleeve correspondingly defining a plurality of axially spaced grooves which cooperate with the said plurality of recesses.

The detent means for preventing the interlock sleeve from moving axially relatively to the gear-box casing preferably comprises a detent pin which projects from the gearbox casing and enters a transverse slot defined by the interlock sleeve, the base of the slot being formed of two flat portions which are at an obtuse angle to one another and can be contacted by the detent pin to limit the rotary movement of the interlock sleeve to between two angular positions. However, as an alternative construction, the transverse slot can have a flat base and the detent means can also include a spring-loaded plunger which similarly enters the transverse slot and is positioned to impose a resistance to rotary movement of the selector shaft beyond an intermediate angular position, the plunger being however movable against the action of the spring in response to rotary movement of the selector shaft beyond this intermediate angular position whereby to permit further rotary movement of the selector shaft for selection of a reverse ratio striker device lug.

A preferred pivotal connection between the lower end portion of the gearshift lever and the free end of the selector shaft comprises a pair of legs formed at the lower end of the gearshift lever, a crank arm at the end of the selector shaft, a crank pin carried by said crank arm and straddled by said pair of legs at the lower end of the gearshift lever, and a pair of spaced flanges on the crank pin at opposite sides of said pair of legs. An alternative pivotal connection, which incorporates a reverse blocker device and so may be preferred in some designs, comprises a pair of unequal length legs formed at the lower end of the gearshift lever, a crank arm at the free end of the selector shaft, and a crank pin carried by said crank arm and straddled by said pair of legs, the longer leg being engageable with the selector shaft to limit movement of the gearshift lever in one direction but the gearshift lever being movable longitudinally to move the longer leg clear of the selector shaft and so permit further movement of the gear-shift lever in said one direction.

In this pivotal connection the crank pin may be mounted eccentrically on the crank arm and the lugs may have cylindrical outer surfaces which contact the inner faces of the spaced flanges to produce a rolling contact which reduces friction. In the case of the pivotal connection incorporating the reverse blocker arrangement the portion of the selector shaft which is engaged by the longer leg is preferably cut away to some extent to form a flat portion, thereby reducing the amount of longitudinal movement of the gearshift lever needed to make the longer leg clear the selector shaft.

The invention also comprehends the assembly comprising the selector shaft, striker devices and lugs extending therefrom, the axially extending key-like projection on the selector shaft, and also the interlock sleeve with its circumferential grooves and intersecting axial grooves.

The scope of the monopoly is defined by the appended claims; the invention and how it may be performed are hereinafter particularly described with reference to several embodiments of a gearshift mechanism according to the invention as illustrated by the accompanying drawings, in which like reference numerals are as far as possible used for like parts in the various embodiments.

In the drawings:

FIGURE 2 is a cross-section on the line II—II of FIGURE 1;

FIGURE 3 is a view in the direction of the arrow III in FIGURE 2, and shows a striker lever for effecting movement of a reverse idler gear;

FIGURE 4 is a cross-section on the line IV—IV in FIGURE 1;

FIGURE 5 is a plan of part of the mechanism shown in FIGURE 1, and shows the relationship between a selector shaft interlock sleeve and striker device lugs;

FIGURES 6, 7 and 8 are comparative end views of the gearshift mechanism shown in FIGURE 1, and show a gearshift lever in three positions;

FIGURE 9 is an end view similar to FIGURE 6 but of a second embodiment of the gearshift mechanism incorporating a modified pivotal connection between the gearshift lever and the selector shaft;

FIGURE 10 is a cross-section similar to FIGURE 4 but of the second embodiment of the gearshift mechanism, and shows a spring-loaded plunger which operates as a reverse blocker;

Figure 1:
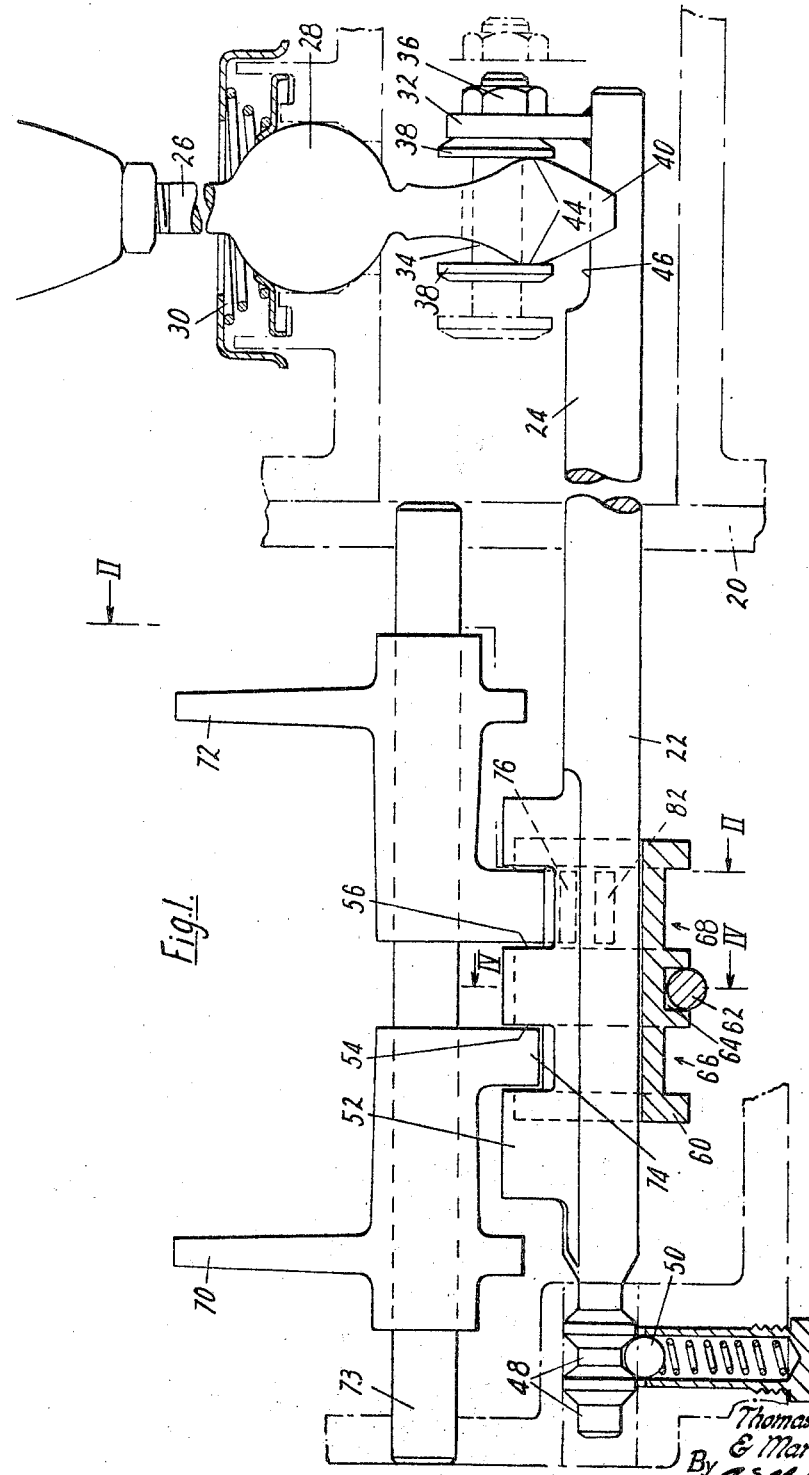
FIGURE 1 is an elevation of a preferred embodiment of a gearshift mechanism according to the invention, some parts being shown in section.

FIGURE 11 is an elevation similar to FIGURE 1 but of a third embodiment of a gearshift mechanism according to the invention, in this embodiment an axially extending key-like projection on the selector shaft defining only a single recess; and FIGURE 12 is an elevation similar to FIGURE 1 but of a fourth embodiment of the gearshift mechanism according to the invention in this embodiment the striker devices being mounted on the selector shaft.

In the preferred embodiment of the gearshift mechanism according to the invention, as best seen in FIGURE 1, a gearbox casing 20 contains a selector shaft 22 which is mounted for rotary and axial movement in bearings (not shown) in the casing 20 with one end 24 projecting from the gearbox casing.

Movement of the selector shaft 22 is effected by means of a gearshift lever 26 which is pivotally mounted near its lower end in a ball mounting 28, the ball being movable upwardly in its socket against the action of a spring 30 when the gearshift lever 26 is moved longitudinally upwards.

A pivotal connection between the lower end portion of the gearshift lever 26 and the free end 24 of the selector shaft 22 includes a crank arm 32 at the free end 24 of the selector shaft and a crank pin 34 which is mounted eccentrically on the crank arm 32 and can be locked in position by means of a nut 36. The crank pin 34 is formed with a pair of spaced flanges 38. The lower end of the gearshift lever 26 is formed with a pair of unequal length legs, namely a longer leg 40 and a shorter leg 42 (FIGURE 6). These legs 40 and 42 straddle the crank pin 34 and have cylindrical outer surfaces 44 which contact the inner faces of the spaced flanges 38 on the crank pin, whereby a stirrup connection is formed between the lower end of the gearshift lever 26 and the free end 24 of the selector shift 22.

Part of the free end 24 of the selector shaft 22 is cut away to form a flat portion 46. As shown in the comparative FIGURES 6, 7 and 8, when the ball mounting 28 of the gearshift lever 26 is in its normal seated position, movement of the gearshift lever in one direction is limited by engagement of the longer leg 40 with the end 24 of the selector shaft. However, movement of the gearshift lever longitudinally upwardly against the spring 30 moves the longer leg 40 clear of the selector shaft and so permits further movement of the gearshift lever in the said one direction past the selector shaft as indicated in FIGURES 7 and 8. The flat portion 46 on the end 24 of the selector shaft allows the longer leg 40 to clear the shaft less upward movement and also, as shown in FIGURE 8, allows the ball mounting 28 of the gearshift lever to assume its normal seated position, when the gearshift lever is in its extreme end position, without the longer leg 40 fouling the selector shaft.

Movement of the gearshift lever 26 in the plane of the paper in FIGURE 1 causes axial movement of the selector shaft, and movement of the gearshift lever normally to the plane of the paper in FIGURE 1 (that is, in the plane of the paper in FIGURE 6) causes rotary movement of the selector shaft. Circumferential grooves 48 are formed in the end of the selector shaft which is supported by the gearbox casing 20, and these grooves can be selectively engaged by a spring-loaded detent ball 50 to locate the selector shaft 22 in the axial direction.

Projecting upwards from the portion of the selector shaft 22 within the gearbox casing 20 is an axially extending key-like projection 52 which defines recesses 54 and 56 axially spaced intermediate the ends of the projection 52.

The axially extending key-like projection 52 enters an axial groove or slot 58 in an interlock sleeve 60 which is slidably mounted on the selector shaft 22 and is prevented from moving axially relatively to the gearbox casing 20 by detent means comprising a detent pin 62 which projects from the gearbox casing 20 into a transverse slot 64 in the interlock sleeve 60. The interlock sleeve defines a pair of axially spaced circumferential grooves 66 and 68 which correspond respectively to the recesses 54 and 56 in the axially extending key-like projection 52 on the selector shaft 22.

The gearbox casing 20 also contains a pair of striker devices 70 and 72 slidably mounted on a common striker device rail 73. As most clearly seen in FIGURE 2, these striker devices 70 and 72 are formed as jaw-like forks, which in conventional manner can each engage a circumferential groove in a clutch coupling sleeve of a change-speed gear assembly, the clutch coupling sleeve being slidable to connect one or other of a pair of gear wheels to a splined mainshaft of the change-speed gear assembly, or to establish a neutral position in which the gear wheels are disconnected from the mainshaft. The striker fork 70 of the gearshift mechanism illustrated is intended to effect sliding of a clutch coupling sleeve for 4th- and 3rd-ratio gear wheels, and the striker fork 72 is intended to effect sliding of a coupling sleeve for 2nd- and 1st-ratio gear wheels, of a 4-forward speed and reverse gearbox.

The striker fork 70 is formed with a lug 74 which is in a common radial plane with, and extends into, the circumferential groove 66 in the interlock sleeve 60. The striker fork 72 is formed with a lug 76 which is in a common radial plane with and extends into the circumferential groove 68 in the interlock sleeve 60. A reverse striker lever 78 (FIGURE 2) pivotally mounted intermediate its ends at a pivot pin 80 is formed at one end with a lug 82 which is also in a common plane with and extends into the circumferential groove 68 in the interlock sleeve 60.

The lugs 74, 76 and 82 of the respective striker devices 70, 72 and 78 are spaced around the selector shaft 22, as best seen in FIGURE 2.

The other end of the reverse striker lever 78 carries a pin 84 which extends into a circumferential groove 86 in a reverse idler gear 88 of the aforementioned 4-forward speed and reverse gear-box, whereby to effect axial movement of the reverse idler gear between the position shown in full lines in FIGURE 3 and the position shown in interrupted lines.

The operation of the gearshift mechanism which has just been described is as follows. The vehicle operator first moves the gearshift lever 26 sideways, that is, in the plane of the paper in FIGURE 6. The stirrup connection formed by the pair of legs 40 and 42 and the crank pin 34 transmits this movement of the gearshift lever to the selector shaft 22 to cause rotary movement of the selector shaft and accordingly of the axially extending key-like projection 52, thereby causing a selected one of the striker device lugs 74, 76 and 82 to enter one of the recesses 54 and 56 in the said axially extending key-like projection. The lug so selected is thereby caused to lie within the axial groove 58 in the interlock sleeve. The vehicle operator then moves the gearshift lever forwards or backwards, that is, in the plane of the paper in FIGURE 1: this forward or backward movement causes the key-like projection 52 to engage the selected lug 74, 76 or 82 and so effect axial movement of the selected lug, thereby either sliding the associated striker fork 70 or 72 along the striker fork rail, or effecting pivotal movement of the reverse striker lever 78 about its pivot pin 80. Such sliding of one of the striker forks 70 or 72 causes the corresponding clutch coupling sleeve to connect or disconnect one of the gear wheels from the gearbox mainshaft as previously described, or the pivotal movement of the reverse striker lever 78 moves the reverse idler gear 88 into or out of engagement with a corresponding pinion wheel in the gearbox.

FIGURE 5 clearly shows that the interlock sleeve allows axial movement of only that selected striker device lug which lies within the axial groove 58, the walls of the circumferential grooves 66 and 68 preventing axial movement of the other two lugs because the axial groove is wide enough to accommodate only one lug at a time and because the interlock sleeve 60 is itself prevented from moving axially by means of the detent pin 62.

As shown in FIGURE 4, the transverse slot 64 which receives this detent pin 62 has its base formed by two flat portions which are at an obtuse angle to each other and thereby limit the rotary movement of the interlock sleeve, and thereby also of the selector shaft, to between two extreme angular positions. However, when the gearshift lever 26 is in its normal position with the ball mounting 28 seated by the action of the spring 30, movement into the reverse ratio position is prevented by engagement of the longer leg 40 with the free end 24 of the selector shaft 22. For engagement of the reverse ratio the gearshift lever 26 must be moved longitudinally upwardly against the force of the spring 30 to move the longer leg 40 clear of the flat portion 46 of the selector shaft, as shown in FIGURE 7, whereafter the gearshift lever can be moved into the reverse ratio position shown in FIGURE 8 and can thereupon again attain its seated position because the presence of the flat portion 46 prevents the longer leg 40 from fouling the end 24 of the selector shaft.

The second embodiment of the gearshift mechanism according to the invention is identical with the preferred embodiment of the gearshift mechanism which has been described with reference to FIGURES 1 to 8, except that a modified arrangement is used to prevent inadvertent selection of reverse ratio, this modified arrangement used in the second embodiment being shown in FIGURES 9 and 10. Comparison of FIGURE 9 with FIGURE 6 shows that in this second embodiment of the gearshift mechanism the stirrup connection incorporates a pair of legs 90 and 92 which are of the same length. Provision for inadvertent engagement of a reverse ratio is provided in connection with the transverse slot 64 in the interlock sleeve 60, in this modified embodiment the transverse slot having a flat face 94 for engagement by a slightly differently shaped detent pin 96 which projects from the gearbox casing 20. A spring-loaded plunger 98 also enters the transverse slot 64 and is positioned to be engaged by the face 94 of the transverse slot 64 before the selector shaft 22 can be moved to the reverse ratio-engaging position. Further rotary movement of the selector shaft towards the reverse ratio-engaging position requires the plunger 98 to move against the force of its spring, whereby there is an increased resistance to rotary movement of the selector shaft into the reverse ratio-engaging position, in which, as described with reference to the preferred embodiment, the lug 82 of the reverse striker lever 78 is selected and moved by the axially extending key-like projection 52 on the selector shaft 59 to cause movement of the reverse idler gear 88 into or out of contact with the associated pinion wheel.

The third embodiment of the gearshift mechanism according to the invention, shown in FIGURE 11, is almost identical with the preferred embodiment of the gearshift mechanism shown in FIGURE 1, the main difference being that in this third embodiment the axially extending key-like projection 52 defines only a single recess 99 and in the sleeve 60 a single groove 100, this recess being in a common radial plane with all three of the striker device lugs 74, 76 and 82. A second difference is that the bearings and detent ball for the selector shaft 22 are arranged somewhat differently from the arrangement in the preferred embodiment of the gearshift mechanism shown in FIGURE 1. A third difference is that the stirrup connection between the lower end of the gearshift lever 26 and the free end 24 of the selector shaft 22 is replaced by a conventional ball and cup connection comprising a ball 102 which is formed at the lower end of the gearshift lever 26 and is received within a cup 104 projecting laterally from the free end 24 of the selector shaft 22. The operation of this third embodiment of the gearshift mechanism according to the invention is as described in connection with FIGURES 1 to 8 except that in this embodiment there is no provision for inadvertent engagement of reverse ratio. It will be observed that the use of the single recess 100 requires that the lug 74 be offset from the fork portion of the striker fork 70.

The fourth embodiment of the gearshift mechanism according to the invention, which is shown in FIGURE 12, is substantially the same in construction and operation as the mechanism shown in FIGURE 11 except that, instead of the striker forks 70 and 72 being mounted on the common striker fork rail 73 shown in FIGURE 1, for compactness in layout these forks are mounted on the selector shaft itself at opposite axial sides of the axially extending key-like projection 52.

The foregoing embodiments of the gearshift mechanism according to the invention which have been described with reference to the accompanying drawings are, of course, purely illustrative of many embodiments falling within the scope of the appended claims, and the invention is only to be limited by the terms of the claims.

We claim:

1. A gearshift mechanism for effecting displacement of coupling members of a change-speed gear between neutral and ratio-engaging positions, comprising a gearbox casing, a selector shaft projecting from the gearbox casing, a gearshift lever pivotally mounted remotely from the gearbox casing, a pivotal connection between the lower end portion of the gearshift lever and the free end of the selector shaft, a striker device rail mounted within the gearbox casing, a plurality of striker devices slidable along said rail to effect displacement of said coupling members, a plurality of striker device lugs extending from the respective striker devices, an axially extending key-like projection on said selector shaft defining a recess intermediate the ends of the projection, the lugs of the striker devices being spaced around the selector shaft and being disposed, when the mechanism is in a neutral position, in a common radial plane with the recess such that movement of the gearshift lever to effect rotary movement of the selector shaft causes any selected lug to lie within the recess and subsequent movement of the gearshift lever to effect axial movement of the selector shaft causes the key-like projection to engage the selected lug and thereby effect sliding movement of the selected striker device, the mechanism also comprising an interlock sleeve which is mounted on the selector shaft for rotation with the shaft, and detent means for preventing the interlock sleeve from moving axially relatively to the gearbox casing, the interlock sleeve defining a circumferential groove which is entered by the striker device lugs and also defining an axial groove which intersects the circumferential groove and is entered by the axially extending key-like projection, such that the said rotary movement of the selector shaft causes the selected striker device lug to enter the axial groove and the said subsequent axial movement of the selector shaft moves said lug along the axial groove, the walls of the circumferential groove preventing movement of the other lugs.

2. A gearshift mechanism for effecting displacement of coupling members of a change-speed gear between neutral and ratio-engaging positions, comprising a gearbox casing, a selector shaft projecting from the gearbox casing, a gearshift lever pivotally mounted remotely from the gearbox casing, a pivotal connection between the lower end portion of the gearshift lever and the free end of the selector shaft, a plurality of striker devices mounted within the gearbox casing on said selector shaft and slidable along said shaft to effect displacement of said coupling members, a plurality of striker device lugs extending from the respective striker devices, an axially extending key-like projection on said selector shaft defining a recess intermediate the ends of the projection, the lugs of the striker devices being spaced around the selector shaft and being disposed, when the mechanism is in a neutral position, in a common radial plane with the recess such that movement of the gearshift lever to effect rotary movement of the selector shaft causes any selected lug to lie within the recess and subsequent movement of the gearshift lever to effect axial movement of the selector shaft causes the key-like projection to engage the selected lug and thereby effect sliding movement of the selected striker device, the mechanism also comprising an interlock sleeve which is mounted on the selector shaft for rotation with the shaft, and detent means for preventing the interlock sleeve from moving axially relatively to the gearbox casing, the interlock sleeve defining a circumferential groove which is entered by the striker device lugs and also defining an axial groove which intersects the circumferential groove and is entered by the axially extending key-like projection, such that the said rotary movement of the selector shaft causes the selected striker device lug to enter the axial groove and the said subsequent axial movement of the selector shaft moves said lug along the axial groove, the walls of the circumferential groove preventing movement of the other lugs.

3. A gear shift mechanism for effecting displacement of coupling members of a change-speed gear between neutral and ratio-engaging positions, comprising a gearbox casing, a selector shaft projecting from the gearbox casing, a gearshift lever connected to the selector shaft to selectively effect rotary and axial movement of the selector shaft, a striker device rail mounted within the gearbox casing, a plurality of striker devices slidable to effect said displacement of said coupling members and several of said plurality being slidable along said rail, a plurality of striker device lugs extending from the respective striker devices, an axially extending key-like projection on said selector shaft defining a plurality of recesses axially spaced intermediate the ends of the projection, the lugs of the striker devices being spaced around the selector shaft and several of said lugs being each disposed, when the mechanism is in a neutral position, in a common radial plane with one of the recesses such that movement of the gearshift lever to effect rotary movement of the selector shaft causes any selected lug to lie within said one recess and subsequent movement of the gear shift lever to effect axial movement of the selector shaft causes the key-like projection to engage the selected lug and thereby effect sliding movement of the selected striker device, each of said recesses being in a common radial plane with at least one of said striker device lugs, the mechanism also comprising an interlock sleeve which is mounted on the selector shaft for rotation with the shaft, and detent means for preventing the interlock sleeve from moving axially relatively to the gearbox casing, the interlock sleeve defining a plurality of axially spaced circumferential grooves which each correspond to one of said recesses in said axially extending projection and which are entered by the striker device lugs and also defining an axial groove which intersects the circumferential grooves and is entered by the axially extending key-like projection, such that the said rotary movement of the selector shaft causes the selected striker device lug to enter the axial groove and the said subsequent axial movement of the selector shaft moves said lug along the axial groove, the walls of the circumferential grooves preventing movement of the other lugs.

4. A gearshift mechanism for effecting displacement of coupling members of a change-speed gear between neutral and ratio-engaging positions, comprising a gearbox casing, a selector shaft projecting from the gearbox casing, a gearshift lever pivotally mounted remotely from the gearbox casing, a pivotal connection between the lower end portion of the gearshift lever and the free end of the selector shaft, a plurality of striker devices mounted within the gearbox casing and slidable to effect said displacement of said coupling members, a plurality of striker devices mounted within the gearbox casing and slidable to effect said displacement of said coupling members, a plurality of striker device lugs extending from the respective striker devices, an axially extending key-like projection on said selector shaft defining a recess intermediate the ends of the projection, the lugs of the striker devices being spaced around the selector shaft and being disposed, when the mechanism is in a neutral position, in a common radial plane with the recess such that movement of the gearshift lever to effect rotary movement of the selector shaft causes any selected lug to lie within the recess and subsequent movement of the gearshift lever to effect axial movement of the selector shaft causes the key-like projection to engage the selected lug and thereby effect sliding movement of the selected striker device, the mechanism also comprising an interlock sleeve which is mounted on the selector shaft for rotation with the shaft, and a detent pin which projects from the gearbox casing and enters a transverse slot defined by said interlock sleeve, the base of said slot being formed by two flat portions which are at an obtuse angle to one another and can be contacted by said detent pin to limit the rotary movement of said interlock sleeve to between two angular positions, the interlock sleeve defining a circumferential groove which is entered by the striker device lugs and also defining an axial groove which intersects the circumferential groove and is entered by the axially extending key-like projection, such that the said rotary movement of the selector shaft causes the selected striker device lug to enter the axial groove and the said subsequent axial movement of the selector shaft moves said lug along the axial groove, the walls of the circumferential groove preventing movement of the other lugs.

5. A gearshift mechanism for effecting displacement of coupling members of a change-speed gear between neutral and ratio-engaging positions, comprising a gearbox casing, a selector shaft projecting from the gearbox casing, a gearshift lever connected to the selector shaft to selectively effect rotary and axial movement of the selector shaft, a plurality of striker devices mounted within the gearbox casing and slidable to effect said displacement of said coupling members, a plurality of striker device lugs extending from the respective striker devices, an axially extending key-like projection on said selector shaft defining a recess intermediate the ends of the projection, the lugs of the striker devices being spaced around the selector shaft and being disposed, when the mechanism is in a neutral position, in a common radial plane with the recess such that movement of the gearshift lever to effect rotary movement of the selector shaft causes any selected lug to lie within the recess and subsequent movement of the gearshift lever to effect axial movement of the selector shaft causes the key-like projection to engage the selected lug and thereby effect sliding movement of the selected striker device, the mechanism also comprising an interlock sleeve which is mounted on the selector shaft for rotation with the shaft, a detent pin which projects from the gearbox casing and enters a transverse slot defined by said interlock sleeve, and a spring-loaded plunger which also enters said transverse slot and is positioned to impose a resistance to rotary movement of said selector shaft beyond an intermediate angular position but is movable against the action of the spring, in response to rotary movement of said selector shaft beyond said intermediate angular position, to permit further rotary movement of said selector shaft for selection of a reverse ratio striker device lug, the interlock sleeve defining a circumferential groove which is entered by the striker device lugs and also defining an axial groove which intersects the circumferential groove and is entered by the axially extending key-like projection, such that the said rotary movement of the selector shaft causes the selected striker device lug to enter the axial groove and the said subsequent axial movement of the selector shaft moves said lug along the axial groove, the walls of the circumferential groove preventing movement of the other lugs.

6. A gearshift mechanism for effecting displacement of coupling members of a change-speed gear between neutral and ratio-engaging positions, comprising a gearbox casing, a selector shaft projecting from the gearbox casing, a striker device rail mounted within the gearbox casing, a plurality of striker devices slidable along said rail to effect said displacement of said coupling members, a plurality of striker device lugs extending from the respective striker devices, an axially extending key-like projection on said selector shaft defining a recess intermediate the ends of the projection, the lugs of the striker devices being spaced around the selector shaft and being disposed, when the mechanism is in a neutral position, in a common radial plane with the recess such that rotary movement of the selector shaft causes any selected lug to lie within the recess and subsequent axial movement of the selector shaft causes the key-like projection to engage the selected lug and thereby effect sliding movement of the selected striker device, the mechanism also comprising an interlock sleeve which is mounted on the selector shaft for rotation with the shaft, a detent pin which projects from the gearbox casing and enters a transverse slot defined by said interlock sleeve, and a spring-loaded plunger which also enters said transverse slot and is positioned to impose a resistance to rotary movement of said selector shaft beyond an intermediate angular position but is movable against the action of the spring, in response to rotary movement of said selector shaft beyond said intermediate angular position, to permit further rotary movement of said selector shaft for selection of a reverse ratio striker device lug, the interlock sleeve defining a circumferential groove which intersects the circumferential groove and is entered by the axially extending key-like projection, such that the said rotary movement of the selector shaft causes the selected striker device lug to enter the axial groove and the said subsequent axial movement of the selector shaft moves said lug along the axial groove, the walls of the circumferential groove preventing movement of the other lugs.

7. A gearshift mechanism for effecting displacement of coupling members of a change-speed gear between neutral and ratio-engaging positions, comprising a gearbox casing, a selector shaft projecting from the gearbox casing, a gearshift lever connected to the selector shaft, a crank pin carried by said crank arm and straddled by a pair of legs at the lower end of the gearshift lever, and a pair of spaced flanges on the crank pin at opposite sides of each pair of legs, a plurality of striker devices mounted within the gearbox casing and slidable to effect said displacement of said coupling members, a plurality of striker device lugs extending from the respective striker devices, an axially extending key-like projection on said selector shaft defining a recess intermediate the ends of the projection, the lugs of the striker devices being spaced around the selector shaft and being disposed when the mechanism is in a neutral position, in a common radial plane with the recess such that movement of the gearshift lever to effect rotary movement of the selector shaft causes any selected lug to lie within the recess and subsequent movement of the gearshift lever to effect axial movement of the selector shaft causes the key-like projection to engage the selected lug and thereby effect sliding movement of the selected striker device, the mechanism also comprising an interlock sleeve which is mounted on the selector shaft for rotation with the shaft, a detent pin which projects from the gearbox casing and enters a transverse slot defined by said interlock sleeve, and a spring-loaded plunger which also enters said transverse slot and is positioned to impose a resistance to rotary movement of said selector shaft beyond an intermediate angular position but is movable against the action of the spring, in response to rotary movement of said selector shaft beyond said intermediate angular position, to permit further rotary movement of said selector shaft for selection of a reverse ratio striker device lug, the interlock sleeve defining a circumferential groove which is entered by the striker device lugs and also defining an axial groove which intersects the circumferential groove and is entered by the axially extending key-like projection, such that the said rotary movement of the selector shaft causes the selected striker device lug to enter the axial groove and the said subsequent axial movement of the selector shaft moves said lug along the axial groove, the walls of the circumferential groove preventing movement of the other lugs.

8. A gearshift mechanism for effecting displacement of coupling members of a change-speed gear between neutral and ratio-engaging positions, comprising a gearbox casing, a selector shaft projecting from the gearbox casing, a gearshift lever pivotally mounted remotely from the gearbox casing, a pair of unequal length legs formed at the lower end of the gearshift lever, a crank arm at the free end of the selector shaft, and a crank pin carried by said crank arm and straddled by said pair of legs, the longer leg being engageable with the selector shaft to limit movement of the gearshift lever in one direction but the gearshift lever being movable longitudinally to move the lower leg clear of the selector shaft and so permit further movement of the gearshift lever in said one direction, and a pair of opposed flanges on the crank pin at opposite sides of said pair of legs, a plurality of striker devices mounted within the gearbox casing and slidable to effect said displacement of said coupling members, a plurality of striker device lugs extending from the respective striker devices, an axially extending key-like projection on said selector shaft defining a recess intermediate the ends of the projection, the lugs of the striker devices being spaced around the selector shaft and being disposed, when the mechanism is in a neutral position, in a common radial plane with the recess such that movement of the gearshift lever to effect rotary movement of the selector shaft causes any selected lug to lie within the recess and subsequent movement of the gearshift lever to effect axial movement of the selector shaft causes the key-like projection to engage the selected lug and thereby effect sliding movement of the selected striker device, the mechanism also comprising an interlock sleeve which is mounted on the selector shaft for rotation with the shaft, and detent means for preventing the interlock sleeve from moving axially relatively to the gearbox casing, the interlock sleeve defining a circumferential groove which is entered by the striker device lugs and also defining an axial groove which intersects the circumferential groove and is entered by the axially extending key-like projection, such that the said rotary movement of the selector shaft causes the selected striker device lug to enter the axial groove and the said subsequent axial movement of the selector shaft moves said lug along the axial groove, the walls of the circumferential groove preventing movement of the other lugs.

9. A gearshift mechanism for effecting displacement of coupling members of a change-speed gear between neutral and ratio-engaging positions, comprising a gearbox casing, a selector shaft projecting from the gearbox casing, a gearshift lever pivotally mounted remotely from the gearbox casing, a pair of unequal length legs formed at the lower end of the gearshift lever, a crank arm at the free end of the selector shaft, and a crank pin carried by said crank arm and straddled by said pair of legs, the longer leg being engageable with the selector shaft to limit movement of the gearshift lever in one direction but the gearshift lever being movable longitudinally to move the longer leg clear of the selector shaft and so permit further movement of the gearshift lever in said one direction, and a pair of opposed flanges on the crank pin at opposite sides of said pair of legs, a striker device rail mounted within the gearbox casing, a plurality of striker devices slidable along said rail to effect said displacement of said coupling members, a plurality of striker device lugs extending from the respective striker devices, an axially extending key-like projection on said selector shaft defining a recess intermediate the ends of the projections, the lugs of the striker devices being spaced around the selector shaft and being disposed, when the mechanism is in a neutral position, in a common radial plane with the recess such that movement of the gearshift lever to effect rotary movement of the selector shaft causes any selected lug to lie within the recess and subsequent movement of the gearshift lever to effect axial movement of the selector shaft causes the key-like projection to engage the selected lug and thereby effect sliding movement of the selected striker device, the mechanism also comprising an interlock sleeve which is mounted on the selector shaft for rotation with the shaft, and detent means for preventing the interlock sleeve from moving axially relatively to the gearbox casing, the interlock sleeve defining a circumferential groove which is entered by the striker device lugs and also defining an axial groove which intersects the circumferential groove and is entered by the axially extending key-like projection, such that the said rotary movement of the selector shaft causes the selected striker device lug to enter the axial groove and the said subsequent axial movement of the selector shaft moves said lug along the axial groove, the walls of the circumferential groove preventing movement of the other lugs.

10. For use in a gearshift mechanism for effecting displacement of coupling members of a change-speed gear between neutral and ratio-engaging positions, a selector shaft mounted for axial and rotary movement, a pivotally mounted gearshift lever, a pair of legs formed at the lower end of the gearshift lever, a crank arm mounted on the selector shaft, a crank pin carried by said crank arm in spaced parallel relation to said selector shaft and straddled by said pair of legs, a pair of spaced flanges on said crank pin at opposite sides of said pair of legs, and limiting means on one of said legs cooperating with said selector shaft to limit movement of said gearshift lever.

11. For use in a gearshift mechanism for effecting displacement of coupling members of a change-speed gear between neutral and ratio-engaging positions, a selector shaft mounted for axial and rotary movement, a gearshift lever mounted for pivotal movement and also for longitudinal movement against a resilient bias, a pair of unequal length legs formed at the lower end of the gearshift lever, a crank arm at the free end of the selector shaft, a crank pin carried by said crank arm and straddled by said pair of legs, and a pair of spaced flanges on said crank pin at opposite sides of said pair of legs, the longer leg being engageable with the selector shaft to limit movement of the selector shaft in one direction but said longitudinal movement of the gearshift lever against said resilient bias causing said longer leg to move clear of the selector shaft and so permit further movement of the gearshift lever in said one direction.

12. For use in a gearshift mechanism for effecting displacement of coupling members of a change-speed gear between neutral and ratio-engaging positions, a selector shaft mounted for axial and rotary movement, a gearshift lever mounted for pivotal movement and also for longitudinal movement against a resilient bias, a pair of unequal length legs formed at the lower end of the gearshift lever, a crank arm at the free end of the selector shaft, a crank pin mounted eccentrically on said crank arm and straddled by said pair of legs, and a pair of spaced flanges on said crank pin at opposite sides of said pair of legs, said legs having cylindrical outer surfaces which contact the inner faces of said spaced flanges, the longer leg being engageable with the selector shaft to limit movement of the selector shaft in one direction but said longitudinal movement of the gearshift lever against said resilient bias causing said longer leg to move clear of the selector shaft and so permit further movement of the gearshift lever in said one direction.

13. A selector shaft assembly according to claim 12, wherein the selector shaft includes a flat portion positioned to reduce the amount of longitudinal movement of the gearshift lever needed to make the longer leg clear the selector shaft.

14. For use in a gearshift mechanism for effecting displacement of coupling members of a change-speed gear between neutral and ratio-engaging positions, a selector shaft mounted for rotary and axial movement, a plurality of striker device lugs for effecting axial movement of respective striker devices to thereby effect said displacement of said coupling members, an axially extending key-like projection projecting from a limited axially extending side surface area of said selector shaft and defining a recess intermediate the ends of the projection, a sleeve having a bore of uniform cross-section the same as the cross-section of said selector shaft mounted on said selector shaft in bearing contact with the remaining axially extending side surface area of said selector shaft, having an axial slot to closely receive said projection and an external circumferentially extending groove having substantially the same cross-section as said recess in said key-like projection, means engaging said sleeve to prevent axial movement of said sleeve and permitting rotary movement thereof, the striker device lugs being spaced around the selector shaft and being disposed, when the mechanism is in a neutral position, in a common radial plane with the recess and the groove such that rotary movement of the selector shaft causes any selected lug to lie within the recess and the others within the groove and subsequent axial movement of the selector shaft causes the key-like projection to engage the selected lug to effect axial movement thereof and the other lug to be held in said groove.

15. The invention defined in claim 14 and said slot extending completely through said sleeve for the full length of said sleeve.

16. The invention defined in claim 14 and means to resist rotation of said sleeve acting on said sleeve during rotation of said sleeve for selection of a lug.

17. The invention defined in claim 10 and means to disable said limiting means.

References Cited by the Examiner

UNITED STATES PATENTS

| | | | |
|---|---|---|---|
| 594,358 | 11/1897 | Catton | 74—104 |
| 1,485,278 | 2/1924 | Lancia | 74—473 |
| 1,726,132 | 8/1929 | Williams | 74—477 |
| 3,064,493 | 11/1962 | Popovich et al. | 74—473 |

FOREIGN PATENTS 448,206   4/1948   Canada.

MILTON KAUFMAN, *Primary Examiner.*